（12） United States Patent
Hanks et al.

(10) Patent No.: US 8,734,638 B2
(45) Date of Patent: May 27, 2014

(54) EBULLATING BED METHODS FOR TREATMENT OF BIOCOMPONENT FEEDSTOCKS

(75) Inventors: Patrick L. Hanks, Annandale, NJ (US); Kathryn Younger Cole, Easton, PA (US); William Ernest Lewis, Baton Rouge, LA (US); Edward Stanley Ellis, Basking Ridge, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 310 days.

(21) Appl. No.: 12/789,037

(22) Filed: May 27, 2010

(65) Prior Publication Data

US 2010/0319242 A1    Dec. 23, 2010

Related U.S. Application Data

(60) Provisional application No. 61/269,092, filed on Jun. 19, 2009.

(51) Int. Cl.
| C10G 45/20 | (2006.01) |
| C10G 65/12 | (2006.01) |
| C10G 49/16 | (2006.01) |

(52) U.S. Cl.
USPC ............. 208/213; 208/89; 208/163; 208/212

(58) Field of Classification Search
USPC .................................. 208/89, 163, 212, 213
See application file for complete search history.

(56) References Cited

U.S. PATENT DOCUMENTS

| 6,156,695 | A | 12/2000 | Soled et al. |
| 6,162,350 | A | 12/2000 | Soled et al. |
| 6,299,760 | B1 | 10/2001 | Soled et al. |
| 6,436,279 | B1 | 8/2002 | Colyar |
| 6,582,590 | B1 | 6/2003 | Riley et al. |
| 6,712,955 | B1 | 3/2004 | Hou et al. |
| 6,783,663 | B1 | 8/2004 | Riley et al. |
| 6,863,803 | B1 | 3/2005 | Riley et al. |
| 6,929,738 | B1 | 8/2005 | Riley et al. |
| 7,229,548 | B2 | 6/2007 | Riley et al. |
| 7,288,182 | B1 | 10/2007 | Soled et al. |
| 7,410,924 | B2 | 8/2008 | Corma Canos et al. |
| 7,544,632 | B2 | 6/2009 | Soled et al. |
| 8,142,527 | B2 * | 3/2012 | Herskowitz et al. ............ 208/15 |
| 8,143,469 | B2 * | 3/2012 | Koivusalmi et al. ............ 208/15 |
| 2005/0040080 | A1 | 2/2005 | Riley et al. |
| 2005/0277545 | A1 | 12/2005 | Shih et al. |

(Continued)

FOREIGN PATENT DOCUMENTS

| EP | 1396531 | 3/2004 |
| WO | 2004/007646 A1 | 1/2004 |

(Continued)

*Primary Examiner* — Randy Boyer

(57) ABSTRACT

Processes are provided for producing a diesel fuel product having a sulfur content of 15 wppm or less (e.g., 10 wppm or less) from feed sources that include a biocomponent feedstock. The biocomponent feedstock can be initially co-processed with a mineral feed in a fluidized bed stage, such as an ebullating bed processing stage. Ebullating bed processing can mitigate the impact of the biocomponent feed on other hydrotreatment aspects of a diesel boiling range feed. Challenged biocomponent feeds can be handled by introducing the biocomponent feed into the ebullating bed reactor in a manner that reduces the fouling impact of the feed.

12 Claims, 4 Drawing Sheets

(56) References Cited

U.S. PATENT DOCUMENTS

| | | |
|---|---|---|
| 2006/0060502 A1 | 3/2006 | Soled et al. |
| 2007/0084754 A1 | 4/2007 | Soled et al. |
| 2007/0141293 A1 | 6/2007 | Wisnudel et al. |
| 2007/0175795 A1 | 8/2007 | Yao et al. |
| 2008/0132407 A1 | 6/2008 | Bai et al. |
| 2008/0156694 A1* | 7/2008 | Chapus et al. .................. 208/61 |
| 2008/0161614 A1 | 7/2008 | Bertoncini et al. |
| 2008/0173570 A1 | 7/2008 | Marchand et al. |

FOREIGN PATENT DOCUMENTS

| | | |
|---|---|---|
| WO | 2007/084437 A2 | 7/2007 |
| WO | 2007/084438 A2 | 7/2007 |
| WO | 2007/084439 A1 | 7/2007 |
| WO | 2007/084471 A1 | 7/2007 |
| WO | 2007125332 | 11/2007 |
| WO | 2008/020048 A2 | 2/2008 |
| WO | WO 2009/037400 A2 * | 3/2009 |

* cited by examiner

EBULLATING BED METHODS FOR TREATMENT OF BIOCOMPONENT FEEDSTOCKS

This Application claims the benefit of U.S. Provisional Application 61/269,092 filed Jun. 19, 2009.

FIELD OF THE INVENTION

Methods are provided related to processing mixtures of biocomponent and mineral feeds in ebullating bed reactors.

BACKGROUND OF THE INVENTION

Fuels based on biocomponent sources will become increasingly prevalent in the future. Already, various governments have instituted current and future requirements that motor fuel pools contain a minimum percentage of fuel derived from a biocomponent source, such as a plant, animal, fish, or algae based oil or fat.

Producing diesel fuel from biocomponent sources presents a variety of challenges. For mineral oil feeds, one of the major problems has been the removal of sulfur and nitrogen heteroatom compounds, in order to comply with regulatory specifications regarding permissible levels of such heteroatoms in fuels. Extensive research has been performed on hydroprocessing methods as well as other methods for removing such heteroatoms. One advantage of some biocomponent feedstocks is that the feeds do not typically contain substantial sulfur and/or nitrogen contamination. However, this advantage is offset somewhat by the presence of other compounds in biocomponent feeds, such as oxygen-containing compounds.

U.S. Patent Application Publication No. 2008/0161614 describes two stage co-processing of a feed including both vegetable/animal and mineral oil. The first stage is operated at lower severity to primarily treat the vegetable and/or animal oil in the feed. The product of the first stage is then stripped to remove gas phase impurities. The stripped product is then hydrotreated in a more severe hydrotreatment stage to produce a diesel fuel.

U.S. Patent Application Publication No. 2007/0175795 describes a method for hydroprocessing mixtures of mineral oils, such as light cycle oils, and triglyceride containing materials, such as vegetable oils. The method can be used with a fluidized bed reactor.

U.S. Patent Application Publication No. 2007/0141293 describes a method for hydroprocessing mixtures of mineral oils and triglyceride containing materials, such as vegetable oils. The method can be used with a fluidized bed reactor.

U.S. Patent Application Publication No. 2008/0173570 describes a two stage hydrotreatment process. In a first stage, a deep hydrodesulfurization is performed on a mineral (gas oil) feed to meet a desired specification. At least a portion of this desulfurized mineral feed is then combined with a feed having at least a portion from a vegetable or animal source. The mixed feed is hydrotreated in a second reactor to make a gas oil fuel base.

PCT Publication No. WO/2008/020048 describes a method for hydrotreating mixtures of triglycerides and vacuum gas oil. Use of an ebullating bed for the hydrotreatment step is noted as a preferred embodiment. However, no examples of use of an ebullating bed are provided.

SUMMARY OF THE INVENTION

In an embodiment, a method for producing a low sulfur diesel product is provided. The method can include hydrotreating a diesel boiling range mineral feedstock in a first reaction zone to produce a hydroprocessed feedstock. Preferably, the first effective hydrotreating conditions can include an LHSV of about 0.1 $hr^{-1}$ to about 10 $hr^{-1}$, a total pressure of about 200 psig to about 4000 psig (about 1.38 MPag to about 27.6 MPag), and a temperature of about 450° F. to about 800° F. (about 232° C. to about 427° C.). The hydrotreated diesel boiling range effluent is cascaded to an ebullating bed reactor. A biocomponent feedstock can also be introduced into the ebullating bed reactor, at a location above the catalyst support grid. The mixed mineral and biocomponent feeds can be hydrotreated in the ebullating bed reactor under second effective hydrotreating conditions to produce a diesel boiling range product. Preferably, the second effective hydrotreating conditions can include an LHSV of 0.25 $hr^{-1}$ to about 4 $hr^{-1}$, a total pressure of about 300 psig to about 1500 psig (about 2.0 MPag to about 10.3 MPag), and a temperature of about 600° F. to about 700° F. (about 315° C. to about 371° C.).

In another embodiment, a method for producing a low sulfur diesel product is provided. The method can include introducing a mineral feedstock having a T5 boiling point of at least about 600° F. (about 315° C.). The feedstock can be hydroprocessed in a first reaction zone under first effective hydroprocessing conditions to cause conversion of at least a portion of the feedstock to diesel boiling range compounds. Preferably, the first effective hydroprocessing conditions can include an LHSV of about 0.3 $hr^{-1}$ to about 2.0 $hr^{-1}$, a total pressure from about 800 psig to about 3000 psig (about 5.5 MPag to about 20.7 MPag), a treat gas ratio of at least about 2000 scf/bbl (about 337 $Nm^3/m^3$) of at least about 80% hydrogen, and a temperature of about 650° F. to about 800° F. (about 343° C. to about 427° C.). The hydroprocessed feedstock can be fractionated to produce a diesel boiling range fraction and a portion boiling higher than the diesel range. The diesel boiling range fraction can then be mixed with a biocomponent feedstock in an ebullating bed reactor, the biocomponent feedstock being introduced above the catalyst support grid. The mixed feedstock can be hydrotreated in the ebullating bed reactor under second effective hydrotreating conditions. Preferably, the second effective hydrotreating conditions can include an LHSV of about 0.25 $hr^{-1}$ to about 4 $hr^{-1}$, a total pressure of about 250 psig to about 800 psig (about 1.7 MPag to about 5.5 MPag), and a temperature of about 550° F. to about 750° F. (about 288° C. to about 399° C.). The liquid effluent from the ebullating bed reactor can then be hydrotreated in a supplemental reactor under effective hydrotreating conditions to make a diesel boiling range produce having a desired sulfur specification.

DETAILED DESCRIPTION OF THE EMBODIMENTS

Figure 1:
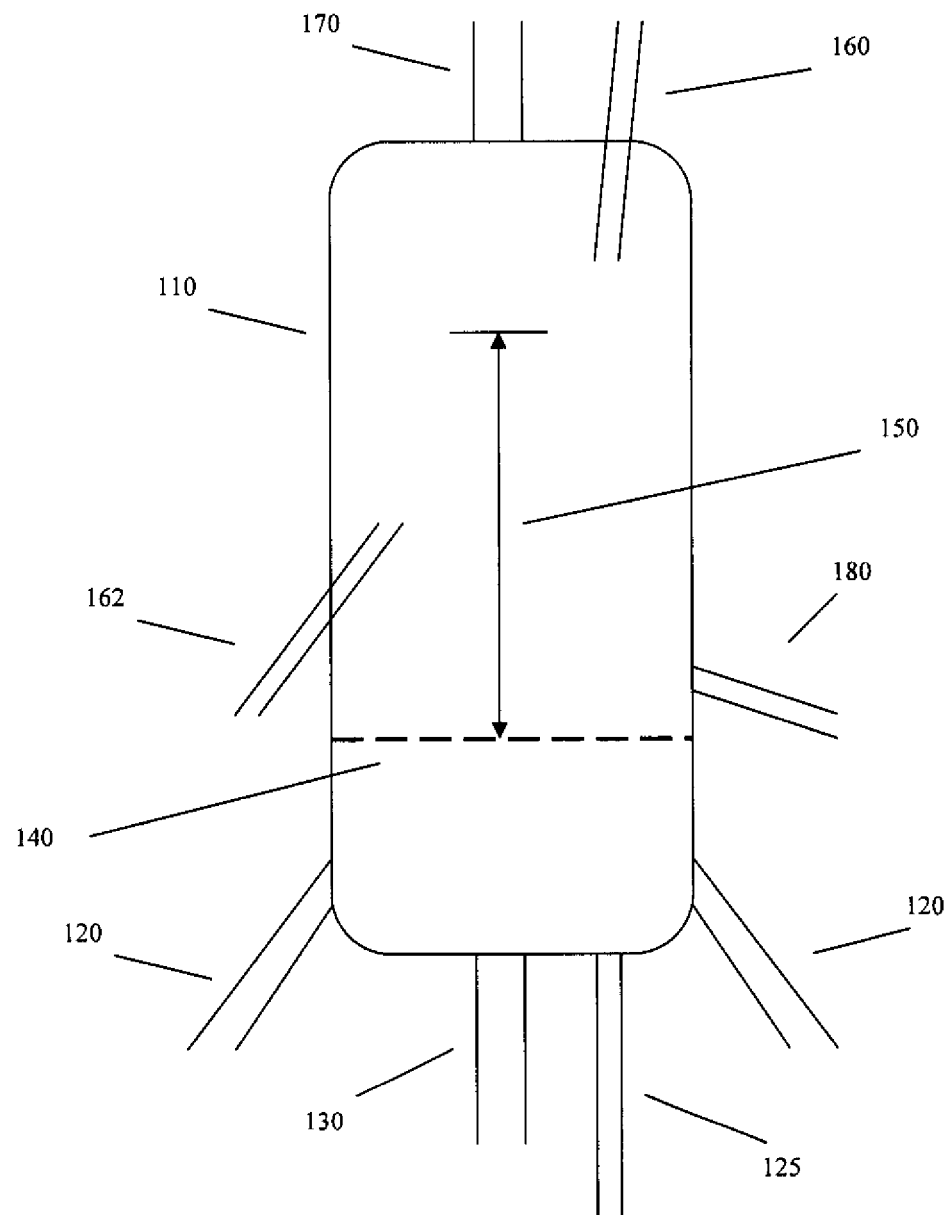
FIG. 1 schematically shows a fluidized bed reactor suitable for performing an embodiment of the invention.

In various embodiments, this invention provides processes for producing diesel fuels that include up to about 100% by weight of a biocomponent feedstock and also have sulfur levels of about 15 ppm by weight or less, preferably about 10 ppm by weight or less. Although most of the embodiments are described herein with reference to a diesel fuel product, it is believed that most, if not all, the embodiments detailed herein can additionally or alternately be used to obtain other fuels such as a jet fuel product and/or a home heating oil product.

In an embodiment, the desired goals of the invention can be achieved by co-processing a biocomponent feedstock with a mineral feedstock in at least one stage of a multiple stage reaction system. The multiple stage reaction system can include at least one ebullating bed reactor, which is the first reactor where the biocomponent feed and a mineral feed are co-processed. The amount of separate processing of the biocomponent and the mineral feed can vary depending on the embodiment. The ebullating bed reactor can allow the biocomponent feed to be co-processed while still providing good temperature control for the reactor. The ebullating bed reactor can also mitigate fouling of the catalyst, as catalyst can be removed and replenished during operation. Additionally, in some embodiments the ebullating bed reactor can facilitate lower temperature processing of the biocomponent portion of the feed. Thus formation of diesel fuel products from combined mineral and biocomponent sources with lower overall amounts of polynuclear aromatic hydrocarbons can be enabled. The ebullating bed reactor can be incorporated into one of several types of existing refinery configurations for producing a diesel fuel product.

A fluidized bed reactor, such as an ebullating bed reactor, is well-suited to handle many of the difficulties associated with processing a biocomponent feedstock. For example, biocomponent diesel range feeds typically contain a large amount of oxygen that may need to be removed in order to make a suitable diesel fuel. Ebullating bed reactors can tend to have an advantage in that gases such as hydrogen are typically well mixed throughout the fluidized bed. This effective mixing may reduce the amount of excess hydrogen needed in order to achieve full reaction with the oxygen in the biocomponent feed. Removing oxygen from a biocomponent feed is also an exothermic reaction, which has the potential to overwhelm the temperature control systems of a standard hydrotreatment reactor. In addition to the mixing advantages of a fluidized bed, which should minimize hot spots within the bed, ebullating bed reactors also typically operated with a recycle loop. Recycling of the feed can tend to dampen any temperature increase due to reaction with a high oxygen content feedstock.

Ebullating bed reactors can effectively produce diesel fuel under a variety of configurations. One option is to take an existing diesel range stream that has been treated to remove the majority of the sulfur and combine the diesel range stream with a biocomponent feed in an ebullating bed reactor. This option allows for treatment of the biocomponent stream in a conventional hydrotreatment process. The addition of the diesel feed can reduce the impact of any temperature rise in the reactor, and, since the diesel feed has previously been treated to remove sulfur, any inhibition of sulfur removal due to the presence of oxygen containing compounds is believed to have relatively low (minimal) impact the final product quality. Additionally, the temperature during the removal of oxygen can be lower, since the feed is already sufficiently desulfurized. This can advantageously reduce the amount of polynuclear aromatic hydrocarbons formed during hydrotreatment. In various embodiments, a diesel fuel product may be further processed by dewaxing the diesel fuel product, e.g., in order to improve the cold flow properties of the fuel.

Another option is to combine a mineral feed with a biocomponent feed for a first hydroprocessing treatment in an ebullating bed reactor. In various embodiments, a desired outcome for the first reaction stage (where a biocomponent feed and a mineral feed are co-processed) can be to produce a feed with an oxygen content of about 0.1 wt % or less, preferably about 0.05 wt % or less. In order to achieve this deoxygenation, the first reaction stage involving both a biocomponent feed and a mineral feed can include hydroprocessing conditions that are sufficient to remove at least about 90% of oxygen-containing molecules from the combined feed, preferably at least about 95%, or even as much as at least about 98%.

The diesel range portion of the product can then be separated out and processed in a hydrotreatment reactor to reduce the sulfur content to a desired level. In various embodiments, a diesel fuel product may be further processed by dewaxing the diesel fuel product, e.g., in order to improve the cold flow properties of the fuel. In alternative embodiments, the feedstock to the ebullating bed reactor can include a pyrolysis oil, a combination of a pyrolysis oil and a biocomponent feed, a combination of pyrolysis oil and another mineral feed, or a combination of a pyrolysis oil, another mineral feed, and a biocomponent feed.

In the discussion below, a biocomponent feedstock refers to a hydrocarbon feedstock derived from a biological raw material component, such as vegetable fats/oils or animal fats/oils (including fish and algae fats/oils). Note that for the purposes of this document, vegetable fats/oils refer generally to any plant based material, and include fat/oils derived from a source such as plants from the genus *Jatropha*. The vegetable oils, animal fats, and algae fats/oils that can be used in the present invention can advantageously include any of those which comprise triglycerides and/or free fatty acids (FFA). The triglycerides and FFAs typically contain aliphatic hydrocarbon chains in their structure having from 8 to 36 carbons, preferably from 10 to 26 carbons, for example from 14 to 22 carbons. Other types of feed that are derived from biological raw material components include fatty acid esters, such as fatty acid alkyl esters (e.g., FAME and/or FAEE). Examples of biocomponent feedstocks include but are not limited to rapeseed (canola) oil, peanut oil, sunflower oil, tall oil, corn oil, soy oils, castor oil, *jatropha* oil, jojoba oil, olive oil, flaxseed oil, palm oil, and the like, and combinations thereof.

Biocomponent based diesel boiling range feedstreams can typically have low nitrogen and sulfur content. For example, a biocomponent based to feedstream can contain up to about 300 parts per million by weight (wppm) nitrogen (in the form of nitrogen-containing compounds). Instead of nitrogen and/or sulfur, the primary heteroatom component in biocomponent based feeds is oxygen (in the form of oxygen-containing compounds). Suitable biocomponent diesel boiling range feedstreams can include up to about 10-12 wt % oxygen. Mineral feedstreams for blending with a biocomponent feedstream can have a nitrogen content from about 50 to about 6000 wppm nitrogen, for example from about 50 to about 2000 wppm, such as from about 75 to about 1000 wppm nitrogen. In an embodiment, feedstreams suitable for use herein can have a sulfur content from about 100 to about 40000 wppm sulfur, for example from about 200 to about 30000 wppm, such as from about 350 to about 25000 wppm. In some embodiments, the mineral stream for blending with the biocomponent stream can be a diesel boiling range stream. In other embodiments, the mineral stream can be a higher boiling stream, such as an atmospheric or vacuum gas oil. In still other embodiments, the mineral stream can be a lighter boiling stream, such as a heavy naphtha, a catalytically cracked feed or product (e.g., for/from FCC), and/or a virgin naphtha stream. Other examples of suitable mineral streams can include resid, cycle oils, and coker derived oils, as well as combinations of any of these and/or any of the other aforementioned streams.

In some embodiments, the biocomponent based feedstream can be a lower quality feed. Typically, the biocomponent feeds selected for co-processing with a mineral feed can be biocomponent feeds that are already highly processed. For example, initial processing of a biocomponent feed can be used remove excess impurities, such as metals and/or phosphorous, that can contribute to catalyst deactivation. Initial processing can further be used remove particulate matter in the biofeed that could increase fouling of the catalyst. While these more highly processed biocomponent feeds will work, the inventive methods and apparati can also be operable with lower grades of biocomponent feeds, such as crude vegetable oils, refined vegetable oils, or refined and bleached vegetable oils. Animal fats may additionally or alternately be used.

Using an ebullating bed reactor for the initial treatment of a mixture of biocomponent and mineral feed can also provide advantages from an integrated processing standpoint. In an embodiment, additional heat can be removed from the ebullating bed reactor, e.g., by using the recycle loop for the reactor as part of a heat exchange scheme to heat another process. For example, the recycle loop for the ebullating bed reactor can be used to pre-heat the mineral and/or biocomponent feed, as needed. In another embodiment, the gas phase effluent from the ebullating bed reactor can be isolated from the hydrogen recycle loop for the rest of the refinery. This embodiment can prevent the excess carbon oxides generated by processing of the biocomponent feed from entering the main hydrogen recycle loop.

Ebullating Bed Configuration

To facilitate use of lower quality biocomponent feeds in the processes according to the invention, a modified ebullating bed reactor can be used. In a conventional ebullating bed reactor, both the feedstock and the treat gas (e.g., hydrogen) are typically introduced into the reactor from the bottom. A recycled feed containing a portion of the reactor effluent is also optionally but typically introduced into the bottom of the reactor. These streams typically flow upward into the reactor and pass through a catalyst support grid. The catalyst support grid is designed to inhibit/prevent catalyst from entering the areas at the bottom of the reactor where the feed pumps are located. The catalyst in the ebullating bed reactor is generally located above the catalyst support grid.

When the feedstock and gas flows reach the catalyst bed, the bed typically becomes fluidized, leading to expansion of the size of the bed as well as to mixing within the bed. The feed(s) and treat gas (hydrogen) typically react within the bed to form products, typically including liquid phase products and gas phase products. The flow in the reactor generally continues upward until an effluent is drawn off the reactor at the top. This gas phase effluent can typically be a combination of desired products, unreacted treat gas (hydrogen), and byproduct gases, generally including contaminant gases such as $H_2S$ or $NH_3$ that were formed during the reaction. All, or more usually a portion, of the liquid phase effluent can be recycled to the bottom of the reactor. If desired, the gases can be separated from the liquid portion of the effluent that is not recycled.

While the above method for using an ebullating bed can be effective for treating a wide variety of feeds, use of an ebullating bed reactor for challenging biocomponent feeds still poses difficulties. For example, one of the advantages of an ebullating bed reactor is that catalyst can be removed and replenished continuously during operation. Thus, if the catalyst becomes fouled, coked, or otherwise deactivated during a reaction, a portion of the deactivated catalyst can be removed for regeneration and/or rejuvenation, while regenerated, rejuvenated, and/or fresh catalyst can be added. However, biocomponent feeds that are less processed can also cause fouling in the catalyst support grid. Fouling of the support grid can lead to a greater pressure drop across the support grid, and therefore slower processing speeds. Fouling can also reduce the run length time between shutdowns for a reactor.

In order to overcome these difficulties, the biocomponent feed to the ebullating bed reactor can be introduced at a location that is downstream from the catalyst support grid. In a conventional ebullating bed design, introducing feed downstream from the catalyst support grid is not desirable, as such a feed would be less effective in creating the fluidized bed and flow patterns that are desired for proper ebullating bed operation. However, when a biocomponent feed and a mineral feed are co-processed in the ebullating bed, a sufficient amount of mineral feed and/or recycled feed can be introduced at the bottom of the reactor to overcome any fluidization and/or flow issues.

FIG. 1 schematically shows an example of an ebullating bed configuration suitable for use with more challenging biocomponent feeds, such as unrefined vegetable oil feeds or animal fat feeds. In FIG. 1, an ebullating bed type reactor is schematically represented at 110. Feed can be introduced into reactor 110 via one or more inlets 120, while hydrogen for the hydrotreatment reaction can be introduced via one or more inlets 125. Note that the inlets for feed and hydrogen could be the same in some embodiments, where feed and hydrogen are combined before introduction into the reactor. Recycled effluent from the reactor may also be introduced into the bottom of the reactor via inlet 130. In the embodiment shown in FIG. 1, the fresh feed, recycled effluent, and gas introduced into the reactor flow upward through catalyst support grid 140 to reach catalyst bed 150. Catalyst bed 150 is schematically represented by indicating a portion of the reactor that could be filled with the fluidized catalyst during operation. Catalyst addition line 160 and catalyst withdrawal line 162 allow catalyst to be added and removed during operation. Although lines 160 and 162 are shown as separate conduits in separate places, the conduits may enter/exit the reactor in any convenient location and/or may represent more than one catalyst addition and/or catalyst withdrawal line, depending upon variables such as configuration. For example, catalyst withdrawal line 162 could be a conduit that exits the reactor via the interior of a feed inlet 120. Effluent outlet 170 allows processed feed to exit the reactor, with a portion of the processed feed preferably being used as recycled feed for the reactor. In various embodiments, biocomponent feeds can be introduced into the reactor via side injectors 180, which are located above (i.e., on the catalyst side of) the catalyst support grid. Biocomponent feeds that are introduced above the catalyst support grid are believed to have less opportunity to foul the support grid, thus allowing for longer continuous operation of the reactor.

Ebullating beds can be incorporated into a process for hydrotreating biocomponent feedstocks in a variety of manners. Several exemplary configurations are provided below to illustrate use of ebullating bed reactors.

Configuration Example 1

Mineral Diesel Hydrotreatment Followed by Co-Processing of Mineral Diesel and Biocomponent Feeds In various embodiments, a mineral feedstock can be processed in an initial hydrotreatment stage (first reactor or reaction zone), and the resulting hydrotreated feed can then be combined with a biocomponent feedstock for processing in an ebullating bed reactor (second reactor or reaction zone). For example, a mineral diesel boiling range feedstock can be processed in a hydrotreatment reactor. Preferably, the mineral feedstock can be hydrotreated under sufficiently severe conditions to satisfy a desired specification for use as a fuel basestock and/or blending stock. At least a portion of the hydrotreated mineral feed can then be blended with a biocomponent feedstock for treatment in an ebullating bed (or other fluidized bed) reactor. Preferably, the biocomponent feedstock can be blended with the mineral feedstock in the ebullating bed reactor, so that the biocomponent feedstock can be introduced into the reactor above the catalyst support grid. Because the mineral feedstock has already been hydrotreated, suppression of hydrotreating activity due to the presence of oxygen in the biocomponent feedstock should be of lower concern. Instead, the conditions in the reactor can be selected to facilitate treatment of the biocomponent feedstock.

Embodiments of the invention that share the features of this type of configuration offer several advantages. For example, this type of configuration can allow for using relatively mild conditions to accomplish the desired hydroprocessing at each stage. Since the biocomponent feed can be added after the mineral feed is sufficiently hydrotreated, the temperature of mineral hydrotreatment process does not have to be increased to compensate for deactivation due to the oxygen content of the biocomponent feed. Operating at lower temperatures can also allow for reduced formation of polynuclear aromatic hydrocarbons. Additionally, the entire effluent from the mineral hydrotreatment step can advantageously be cascaded to the hydrotreatment process for the mixed feed. This means that the hydrogen from the mineral hydrotreatment step can be used to supply some or all of the needed hydrogen for removing the oxygen from the biocomponent feed.

The reaction conditions in the hydrotreatment reactor for the mineral feedstock can be conditions suitable for reducing the sulfur content (in the form of sulfur-containing compounds) of the feedstream to about 15 wppm or less (e.g., to about 10 wppm or less) as the feedstream is exposed to the catalyst beds in the reaction zone. The reaction conditions can include an LHSV of about 0.1 hr$^{-1}$ to about 10 hr$^{-1}$, a total pressure of about 100 psig to about 4000 psig (about 690 kPag to about 27.6 MPag), and a temperature of about 450° F. to about 800° F. (about 232° C. to about 427° C.). Preferably, the reaction conditions include an LHSV of about 0.1 hr$^{-1}$ to about 5 hr$^{-1}$, a total pressure of about 200 psig to about 1500 psig (about 1.4 MPag to about 10.3 MPag), a hydrogen treat gas ratio of about 100 scf/bbl to about 10000 scf/bbl (about 17 Nm$^3$/m$^3$ to about 1685 Nm$^3$/m$^3$) of at least 80% hydrogen (e.g., remainder inert gas), and a temperature of about 550° F. to about 750° F. (about 288° C. to about 399° C.).

The mineral hydrocarbon feedstock that is co-processed with the biocomponent feedstock in the fluidized bed reactor can preferably be a feedstock with an initial boiling point of at least about 250° F. (about 121° C.), thus including a substantial kerosene boiling range component, or at least about 350° F. (about 177° C.), or at least about 450° F. (about 232° C.). Alternatively, the feedstock can be characterized by the boiling point required to boil a specified percentage of the feed. For example, the temperature required to boil at least 5 wt % of a feed is referred to as a "T5" boiling point. In embodiments involving a diesel boiling range feedstock to the fluidized bed, the mineral hydrocarbon feedstock can preferably have a T5 boiling point of at least about 400° F. (about 204° C.), or at least about 450° F. (about 232° C.), or at least about 465° F. (about 241° C.). Preferably, the mineral hydrocarbon feed has a T95 boiling point of about 800° F. (about 427° C.) or less, or about 750° F. (about 399° C.) or less.

The feed to the ebullating bed (or fluidized bed) hydrotreatment stage can include both feeds from biocomponent sources, such as vegetable sources (including plant sources such as algae) or animal sources, and feeds from mineral sources. The feed can include varying amounts of feedstreams based on biocomponent sources, such as vegetable oils, animal fats, fish oils, algae oils or fats, pyrolysis oils, or the like, or combinations or derivatives thereof. For example, the feed may, in some embodiments include a feedstream derived from a biocomponent source, such as from a vegetable oil or an algae oil, e.g., where a carboxylic acid alkyl ester (typically having from 8 to 36 carbons attached to the carboxylate carbon, preferably from 10 to 26 carbons, for example from 14 to 22 carbons; also typically having from 1 to 24 carbons attached via an ester bond to the carboxylate moiety, preferably from 1 to 18 carbons, more preferably from 1 to 12 carbons, for example from 1 to 8 carbons). The feed can include at least about 0.1 wt % of feed based on a biocomponent source, for example at least about 0.5 wt %, at least about 1 wt %, at least about 3 wt %, at least about 10 wt %, or at least about 15 wt %. In such embodiments, the feed can include about 99 wt % or less of biocomponent, for example about 80 wt % or less, about 60 wt % or less, about 50 wt % or less, about 40 wt % or less, or about 30 wt % or less. In other embodiments, the amount of co-processing can be small, with a feed that includes at least about 0.5 wt % of feedstock based on a biocomponent source, for example at least about 1 wt %, at least about 2.5 wt %, or at least about 5 wt %. In such embodiments, the feed can include about 20 wt % or less of biocomponent based feedstock, for example about 15 wt % or less, about 10 wt % or less, or about 5 wt % or less.

In some embodiments, a biocomponent feed can be selected that includes a challenged biocomponent feed, such as animal fat, a crude vegetable oil, an algae oil or fat, a vegetable oil, a pyrolysis oil, or a derivative and/or combination thereof, with only minimal pre-processing. In embodiments where only a portion of the biocomponent feed is a challenged biocomponent feed, the feed can include at least about 10% by weight, for example at least about 20% by weight or at least about 30% by weight of the challenged biocomponent feed. In other embodiments, the biocomponent feed can include about 90% or less by weight, for example about 75% or less by weight, or about 50% or less by weight, of the challenged biocomponent feed.

The catalyst in the ebullating bed hydrotreatment reactor can be a catalyst comprising a Group VIB metal and/or a Group VIII metal, optionally on a support, Suitable metals can include cobalt, nickel, molybdenum, tungsten, and combinations thereof. Suitable supports can include silica, silica-alumina, alumina, and titania. While one preferred embodiment includes a catalyst comprising a Group VIB metal and a Group VIII metal (e.g., in oxide form, or preferably after the oxide form has been sulfidized under appropriate sulfidization conditions), optionally on a support, the catalyst may additionally or alternately contain additional components, such as other transition metals (e.g., Group V metals such as niobium), rare earth metals, organic ligands (e.g., as added or as precursors left over from oxidation and/or sulfidization steps), phosphorus compounds, boron compounds, fluorine-containing compounds, silicon-containing compounds, promoters, binders, fillers, or like agents, or combinations thereof. By way of illustration, suitable catalysts are described, for example, in one or more of U.S. Pat. Nos. 6,156,695, 6,162,350, 6,299,760, 6,582,590, 6,712,955, 6,783,663, 6,863,803, 6,929,738, 7,229,548, 7,288,182, 7,410,924, and 7,544,632, U.S. Patent Application Publication Nos. 2005/0277545, 2006/0060502, 2007/0084754, and 2008/0132407, and International Publication Nos. WO 04/007646, WO 2007/084437, WO 2007/084438, WO 2007/084439, and WO 2007/084471, inter alia.

The reaction conditions in the ebullating hydrotreatment reactor can be conditions suitable for removing oxygen from the biocomponent portion of the feed. Optionally, the conditions can be sufficient to also remove additional sulfur and/or nitrogen from the combined feeds. The reaction conditions can include an LHSV of about 0.2 $hr^{-1}$ to about 4 $hr^{-1}$, a treat gas ratio of about 2500 scf/bbl to about 5000 scf/bbl (about 420 $Nm^3/m^3$ to about 840 $Nm^3/m^3$) of at least 80% hydrogen (preferably at least 95% hydrogen), a total pressure of about 2000 psig to about 2500 psig (about 13.8 MPag to about 17.2 MPag), and a temperature of about 800° F. to about 830° F. (about 427° C. to about 443° C.). Preferably, the LHSV can be about 0.2 $hr^{-1}$ to about 0.6 $hr^{-1}$. Because the ebullating bed reactor has a fluidized bed, catalyst can be added and/or removed during operation. Preferably, the catalyst turnover rate can be about 0.15 pounds to about 0.4 pounds of catalyst per barrel of oil (about 2.1 $kg/m^3$ to about 5.5 $kg/m^3$).

The diesel boiling range feed delivered to the ebullating bed reactor can come from a variety of sources. One option is to deliver a diesel boiling range feed that is at least a portion of the output from a diesel boiling range hydrotreatment process. The diesel boiling range hydrotreatment process could be a process for directly processing an initial diesel boiling range feedstock. Alternatively, the diesel boiling range hydrotreatment process could be a process for treating a diesel boiling range fraction produced from the treatment of a heavier feed, such as a diesel boiling range fraction generated from a catalytic feed hydrotreatment step. Still another option is to use the output from a process for treating a diesel boiling range fraction generated by a fuels or lubricant hydrocracking process. Note that the size of the ebullating bed reactor can be selected to match the biocomponent processing needs. If only a side stream of diesel is used, such as the converted diesel from a heavy feed reactor or only a portion of the effluent from a diesel hydrotreater, then the ebullating bed reactor only needs to be large enough to handle the smaller mineral feed plus the biocomponent portion. This is preferred in embodiments where the hydrotreatment of the mineral feed is sufficient to meet required specifications for a diesel fuel prior to combination with the biocomponent feed.

The product from the second reactor can undergo a variety of additional process steps. Optionally, the product from the second reactor can be separated into a gas phase product and a liquid phase product using a separator. The gas phase product from the separator can be recycled for further use in the second hydrotreating reactor. After separation, the liquid phase product from the second hydrotreating reactor can be exposed to a hydroisomerization catalyst under hydroisomerization conditions. Optionally, before such a hydroisomerization step, the liquid phase product can be passed through a liquid treatment step, such as by exposing the liquid to filtration, a caustic solution wash, or a treatment with chemical agents to remove sulfur and trace contaminants. Additionally or alternately, the liquid phase product can be passed through a sulfur adsorption step, such as by exposing the liquid stream to metallic Ni, ZnO, or another adsorber of sulfur species. In another optional embodiment, the hydrotreated feed can be blended with a feed containing fatty acid alkyl esters (such as FAME and/or FAEE), to further increase the amount of biocomponent.

In still another optional embodiment, the hydrotreated and/or hydroisomerized feed could be hydrofinished. Hydrofinishing can be accomplished using a hydrotreatment reactor operated at a relatively higher space velocity. Thus, hydrofinishing can be viewed as an additional mild hydrotreatment stage. Hydrotreating conditions similar to those described above can also be suitable for hydrofinishing. Thus, suitable hydrofinishing conditions can include an LHSV of about 0.5 $hr^{-1}$ to about 10 $hr^{-1}$, a total pressure of about 100 psig to about 4000 psig (about 690 kPag to about 27.6 MPag), and a temperature of about 450° F. to about 800° F. (about 232° C. to about 427° C.). Preferably, the reaction conditions include an LHSV of from about 0.5 $hr^{-1}$ to about 5 $hr^{-1}$, a total pressure of about 200 psig to about 1500 psig (about 1.4 MPag to about 10.3 MPag), a hydrogen treat gas ratio of about 100 scf/bbl to about 10000 scf/bbl (about 17 $Nm^3/m^3$ to about 1685 $Nm^3/m^3$) of at least 80% hydrogen (e.g., remainder inert gas), and a temperature of about 550° F. to about 750° F. (about 288° C. to about 399° C.).

In embodiments where further improvement of cold flow properties is desirable, a hydroisomerization stage can be included. In yet another alternative embodiment, the entire effluent from the ebullating bed reactor can be passed to the hydroisomerization stage, with fractionation occurring after the hydroisomerization. In still another embodiment, a hydroisomerization catalyst can be included in the catalyst used in the initial ebullating bed reactor. In such an embodiment, a feed could be hydrotreated and hydroisomerized at the same time or in the same reactor in immediately following steps, leading to a desulfurized product with improved low temperature (cold flow) properties. The reaction conditions for performing a hydroisomerization process and a hydrotreatment process can advantageously have some overlap, so conditions can be selected to allow for both effective hydroisomerization and hydrotreatment.

In the optional hydroisomerization stage, the liquid phase product stream from the second reactor can be exposed to one or more reaction zones, optionally present in a separate reactor, that are operated at hydroisomerization conditions in the presence of hydroisomerization catalyst. Generally, catalytic dewaxing can be accomplished by selective hydrocracking or by hydroisomerizing long chain molecules within a feed such as a diesel range feed. Dewaxing catalysts are suitably molecular sieves such as crystalline aluminosilicates (zeolites) or silicoaluminophosphates (SAPOs). These catalysts may also carry a metal hydrogenation component, preferably Group VIII metals, especially Group VIII noble metals. Dewaxing conditions can include temperatures of about 250° C. to about 450° C., preferably about 280° C. to about 380° C., pressures of about 300 psig to about 3000 psig (about 2.1 MPag to about 20.7 MPag), LHSV values of about 0.1 $hr^{-1}$ to about 5.0 $hr^{-1}$, and treat gas ratios of about 500 scf/bbl to about 5000 scf/bbl (about 84 $Nm^3/m^3$ to about 840 $Nm^3/m^3$).

In various embodiments, the molecular sieve used for catalytic dewaxing can comprise an aluminosilicate, e.g., having an MRE framework zeolite such as ZSM-48, which is a 10-membered ring molecular sieve having a 1-D channel structure. ZSM-48-type molecular sieves can perform dewaxing primarily by isomerizing molecules within the feed. Typical silica to alumina ratios for the aluminosilicate can be from about 250 to 1 or less, or from 200 to 1. Preferably, the silica to alumina ratio of the aluminosilicate can be less than about 110 to 1, for example less than about 110 to about 20 or from about 100 to about 40. To form a catalyst, the molecular sieve can be composited with a binder. Suitable binders can include, but are not limited to silica, alumina, silica-alumina, titania, zirconia, or a mixture thereof. Other suitable binders will be apparent to those of skill in the art.

Figure 2:
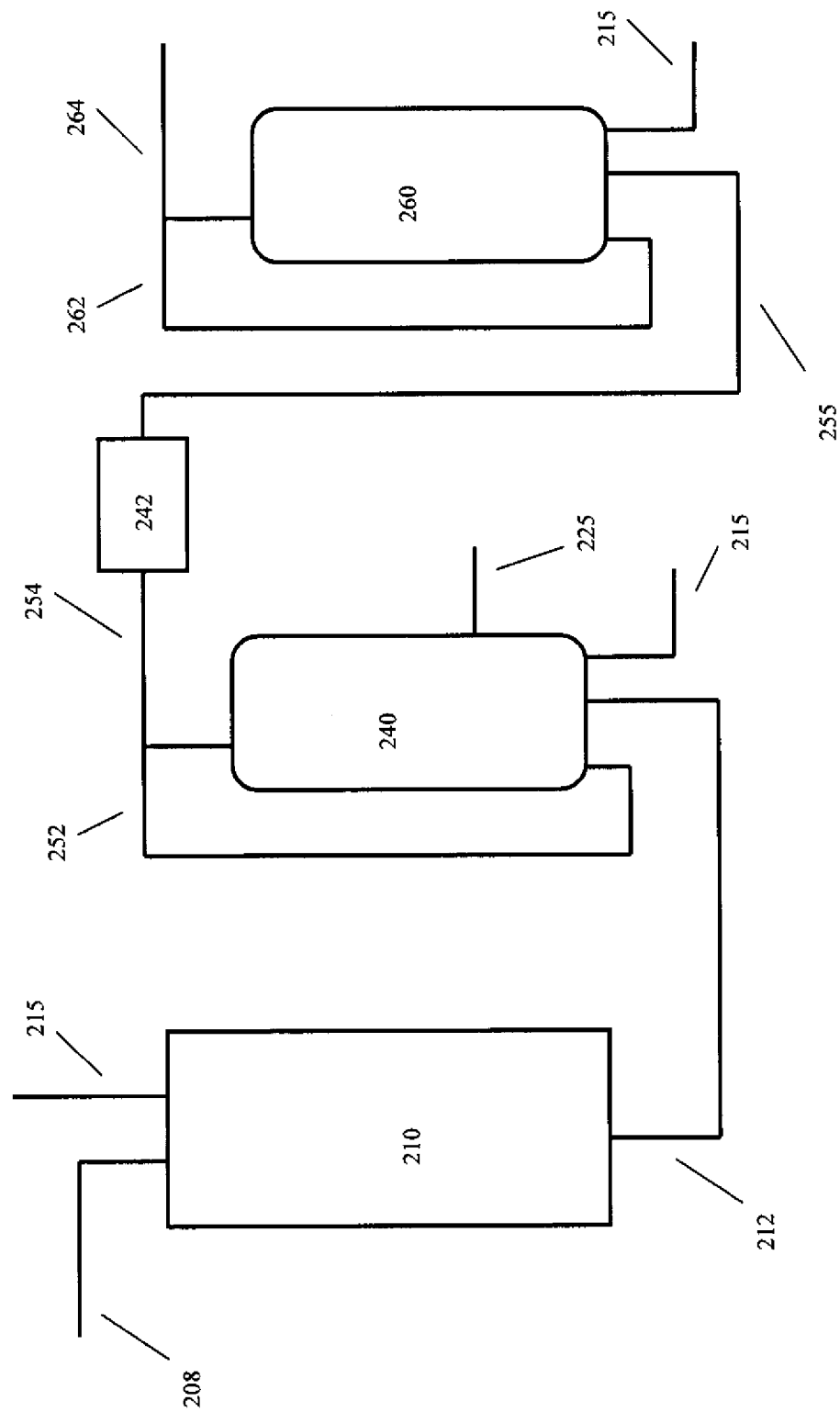
FIG. 2 schematically shows a processing scheme according to an embodiment of the invention.

A reaction system suitable for carrying out the above processes is shown schematically in FIG. 2. In FIG. 2, a diesel boiling range mineral hydrocarbon feedstock 208 can be introduced into a first hydrotreatment reactor 210. A hydrogen treat gas stream 215 can also be introduced into hydrotreatment reactor 210. The mineral feedstock can be exposed to hydrotreating conditions in first hydrotreatment reactor 210 in the presence of one or more catalyst beds that contain hydrotreating catalyst. Preferably, this can reduce the sulfur content in the distillate cut of the treated feedstock to about 50 wppm or less, or about 10 wppm or less, of sulfur (in the form of sulfur-containing compounds).

After passing through first hydrotreatment reactor 210, the effluent 212 (a hydrotreated diesel boiling range feed) can enter second hydrotreatment reactor 240, along with a biocomponent feed 225. Note that a separator is not shown between the first hydrotreatment reactor 210 and ebullating bed reactor 240. A separator could optionally be located between these reactors. In a preferred embodiment, however, the effluent gases can also be cascaded into the ebullating bed reactor, to use the partially consumed hydrogen present in the gases. Preferably, the hydrotreated diesel boiling feed and the biocomponent feed can be mixed in the ebullating bed reactor, so that the biocomponent feed can be introduced into the reactor above the catalyst support grid. After treatment in reactor 240, a portion of the effluent can be recycled 252 to the reactor. The remaining portion of the effluent 254 can advantageously flow into a separator 242. Separator 242 can separate any gaseous products and/or contaminants, such as $H_2$, $H_2S$, $CO$, $CO_2$, or $NH_3$, that may be present in the hydrotreated effluent. Optionally, hydrogen gas from separator 242 can be used as a recycled hydrogen gas stream (not shown) for the second hydrotreatment reactor.

The liquid fraction 255 from separator 242 can advantageously be used as a fuel, for example a diesel fuel product. Alternatively, as shown in FIG. 2, the liquid fraction 255 can be passed into optional hydroisomerization reactor 260 to further improve the cold flow properties of the (diesel) fuel product. The effluent 264 of the hydroisomerization reactor 260 could then be used as a (diesel) fuel product. In the embodiment shown in FIG. 2, the hydroisomerization reactor 260 advantageously represents another ebullating bed reactor. As a result, part of the effluent is recycled 262. Alternatively, a fixed bed or other type of reactor may be used for hydroisomerization reactor 260. Note that, while reactor 260 is described here as a hydroisomerization reactor, alternately a hydrofinishing reactor could be used in place of or in addition to reactor 260.

Configuration Example 2

Heavy Feed Hydrotreatment to Produce Diesel Boiling Range Portion, Followed by Co-Processing of Diesel Boiling Range Portion and Biocomponent In various other embodiments, an ebullating bed reactor can be added to a processing train for hydrotreating a diesel boiling range feed generated during processing of a heavier feedstock. For example, catalytic feed hydrotreatment reactors generally cause some conversion of heavier feedstocks to diesel boiling range compounds. The resulting diesel boiling range product can be separated by fractionation and hydrotreated in a second stage to produce a suitable diesel fuel base. Alternatively, a diesel boiling range fraction from a hydrocracking process could be used. Prior to the second stage hydrotreatment, such a stream could be blended with a biocomponent feedstock in an ebullating bed reactor. The conditions in the ebullating bed reactor can be focused on processing of the biocomponent portion of the feed, such as removing oxygen-containing compounds. The deoxygenated feed can then be forwarded to a hydrotreatment reactor for making a diesel boiling range fuel.

Embodiments that incorporate the features of this configuration can offer several advantages. Since a hydrotreatment step is available after the initial treatment of the mixed biocomponent and mineral feed, the conditions in the initial treatment of the mixed feed can be selected primarily for oxygen removal. This means that the temperature does not have to be increased, and polynuclear aromatic hydrocarbon formation can be reduced or avoided. Additionally, in embodiments where the biocomponent feed is a challenged feed, such as an animal fat, pyrolysis oil, or a crude vegetable oil, the subsequent hydrotreatment step can allow for a second opportunity to remove additional contaminants from the biocomponent portion of the feed.

In embodiments where the diesel boiling range fraction is generated from severe hydrotreatment of a heavier feed, the heavy mineral hydrocarbon feedstock can preferably be a feedstock with an initial boiling point of at least about 550° F. (about 288° C.), for example at least about 600° F. (about 315° C.) or at least about 650° F. (about 343° C.). Additionally or alternately, the feedstock can be characterized by the boiling point required to boil a specified percentage of the feed. For example, the temperature required to boil at least 5 wt % of a feed is referred to as a "T5" boiling point. Preferably, the mineral hydrocarbon feedstock can have a T5 boiling point of at least about 600° F. (about 315° C.), for example at least about 650° F. (about 343° C.) or at least about 665° F. (about 352° C.). Preferably, the mineral hydrocarbon feed can have a T95 boiling point of about 1100° F. (about 593° C.) or less, for example about 1050° F. (about 566° C.) or less. An example of this type of feed can be a catalytically cracked feed (e.g., for FCC). Such a feed typically is hydroprocessed in a relatively high severity hydrotreatment stage prior to introduction into the fluid catalytic cracking stage. Due to the relatively severe conditions, a portion of the feedstock will typically be converted to diesel boiling range compounds. This portion of the feed can be separated by fractionation, and used as a diesel boiling range feedstock.

The reaction conditions for the relatively high severity hydrotreatment can be conditions suitable for reducing the sulfur content of the feedstream while also deoxygenating the feedstream (and optionally but preferably also saturating olefins) as the feedstream is exposed to the catalyst beds in the reactor. In a preferred embodiment, the reaction conditions of the ebullating bed reactor can be selected to perform a thorough hydrodeoxygenation while reducing the sulfur of the feedstock to a content between about 800 wppm and about 1500 wppm. Alternatively, the reaction conditions in the first hydrotreatment reactor can be selected to reduce the sulfur content to between about 100 wppm and about 200 wppm. In still other embodiments, the sulfur can be reduced to about 1500 wppm or less, or about 1000 wppm or less, or about 500 wppm or less, or about 200 wppm or less. Despite the sulfur content being reduced during this relatively high severity treatment, the sulfur content can still be about 50 wppm or more, for example about 100 wppm or more, about 200 wppm or more, or even about 500 wppm or more.

The reaction conditions can include an LHSV of about 0.3 $hr^{-1}$ to about 2.0 $hr^{-1}$, a total pressure of about 800 psig to about 3000 psig (about 5.5 MPag to about 20.7 MPag), a treat gas ratio of at least about 2000 scf/bbl (about 340 $Nm^3/m^3$) of at least about 80% hydrogen (e.g., remainder inert gas), and a temperature of about 650° F. to about 800° F. (about 343° C. to about 427° C.). Preferably, the reaction conditions include an LHSV of about 0.9 hr$^{-1}$ to about 1.1 hr$^{-1}$, a total pressure of about 1400 psig to about 2000 psig (about 9.7 MPag to about 13.8 MPag), a hydrogen treat gas ratio of about 2100 to about 2500 scf/bbl (about 350 Nm$^3$/m$^3$ to about 420 Nm$^3$/m$^3$) of at least about 80% hydrogen (e.g., remainder inert gas), and a temperature of about 700° F. to about 750° F. (about 371° C. to about 399° C.). Alternatively, the hydrogen treat gas ratio can be about 2000 scf/bbl to about 3000 scf/bbl (about 340 Nm$^3$/m$^3$ to about 505 Nm$^3$/m$^3$).

Regardless of the source, a diesel boiling range feedstream can be fractionated out from the effluent of the initial treatment stage and used as a mineral feed to the ebullating bed reactor. Suitable diesel boiling range feedstreams can boil within the range of about 215° F. (about 102° C.) to about 800° F. (about 427° C.). Preferably, the diesel boiling range feedstream has an initial boiling point of at least about 250° F. (about 121° C.), or at least about 300° F. (about 149° C.), or at least about 350° F. (about 177° C.), or at least about 400° F. (about 204° C.), or at least about 451° F. (about 233° C.). Preferably, the diesel boiling range feedstream has a final boiling point of about 800° F. (about 427° C.) or less, for example about 775° F. (about 413° F.) or less or about 750° F. (about 399° C.) or less. In an embodiment, the diesel boiling range feedstream has a boiling range from about 451° F. (233° C.) to about 800° F. (427° C.). In another embodiment, the diesel boiling range feedstream also includes kerosene range compounds to provide a feedstream with a boiling range from about 250° F. (121° C.) to about 800° F. (427° C.).

The diesel boiling range feedstock produced from the relatively high severity hydrotreatment stage can be mixed with a biocomponent feed for processing in an ebullating bed reactor. The feed can include varying amounts of feedstreams based on biocomponent sources, such as vegetable oils, animal fats, fish oils, algae oils, pyrolysis oils, or the like, or combinations or derivatives thereof. The feed can include at least about 0.1 wt % of feed based on a biocomponent source, for example at least about 0.5 wt %, at least about 1 wt %, at least about 3 wt %, at least about 5 wt %, at least about 10 wt %, or at least about 15 wt %. In such embodiments, the feed can include about 99 wt % or less of biocomponent, for example about 80 wt % or less, about 60 wt % or less, about 50 wt % or less, about 40 wt % or less, or about 30 wt % or less. In other embodiments, the amount of co-processing can be small, with a feed that includes at least about 0.5 wt % of feedstock based on a biocomponent source, for example at least about 1 wt %, at least about 2.5 wt %, or at least about 5 wt %. In such an embodiment, the feed can include about 20 wt % or less of biocomponent based feedstock, for example about 15 wt % or less, about 10 wt % or less, or about 5 wt % or less.

In this example, the combined feedstock can be introduced into an ebullating bed (or other fluidized bed) reactor. In this example, the combined feedstock can be exposed to the ebullating bed under hydrodesulfurization and hydrodeoxygenation conditions. Such conditions can also result in olefin saturation of any olefins present in the biocomponent feedstock.

The catalyst in the ebullating bed reactor can be a (hydrotreating) catalyst comprising a Group VIB metal and/or a Group VIII metal, optionally on a support. Suitable metals can include cobalt, nickel, molybdenum, tungsten, and combinations thereof. Suitable supports can include silica, silica-alumina, alumina, and titania. While one preferred embodiment includes a catalyst comprising a Group VIB metal and a Group VIII metal (e.g., in oxide form, or preferably after the oxide form has been sulfidized under appropriate sulfidization conditions), optionally on a support, the catalyst may additionally or alternately contain additional components, such as other transition metals (e.g., Group V metals such as niobium), rare earth metals, organic ligands (e.g., as added or as precursors left over from oxidation and/or sulfidization steps), phosphorus compounds, boron compounds, fluorine-containing compounds, silicon-containing compounds, promoters, binders, fillers, or like agents, or combinations thereof. By way of illustration, suitable catalysts are described, for example, in one or more of U.S. Pat. Nos. 6,156,695, 6,162,350, 6,299,760, 6,582,590, 6,712,955, 6,783,663, 6,863,803, 6,929,738, 7,229,548, 7,288,182, 7,410,924, and 7,544,632, U.S. Patent Application Publication Nos. 2005/0277545, 2006/0060502, 2007/0084754, and 2008/0132407, and International Publication Nos. WO 04/007646, WO 2007/084437, WO 2007/084438, WO 2007/084439, and WO 2007/084471, inter alia.

The reaction conditions in the ebullating bed reactor can be conditions suitable primarily for deoxygenating the feedstream and saturating olefins as the feedstream is exposed to the catalyst beds in the reactor. Optionally, the conditions can be sufficient to also remove additional sulfur and/or nitrogen from the combined feeds. The reaction conditions can include an LHSV of about 0.2 hr$^{-1}$ to about 4 hr$^{-1}$, a total pressure of about 300 psig to about 1500 psig (about 2.1 MPag to about 10.3 MPag), and a temperature of about 600° F. to about 700° F. (about 315° C. to about 371° C.). Preferably, the reaction conditions include an LHSV of about 0.5 hr$^{-1}$ to about 2 hr$^{-1}$, a total pressure of about 350 psig to about 600 psig (about 2.4 MPag to about 4.1 MPag), a hydrogen treat gas ratio of about 950 scf/bbl to about 1050 scf/bbl (about 160 Nm$^3$/m$^3$ to about 180 Nm$^3$/m$^3$) of at least 95% hydrogen (e.g., remainder inert gas), and a temperature of from about 625° F. to about 675° F. (about 329° C. to about 357° C.).

Optionally, the biocomponent portion of the feedstock can be pretreated to remove impurities prior to hydrotreatment. This pretreatment can occur prior to mixing the biocomponent portion of the feedstock with the mineral portion. The pretreatment can include passing the biocomponent portion through an adsorbent to remove metals, filtering the biocomponent portion to remove sediment, or other processes. Additionally or alternately, an optional metals removal pretreatment can take place in the first reactor after mixing of the biocomponent and mineral hydrocarbon feeds, by exposing the combined feedstock to a demetallization catalyst under demetallization conditions prior to hydrodesulfurization and/or hydrodeoxygenation.

After hydrotreatment in the ebullating bed, the hydrotreated feed can be stripped to remove gas phase products, such as $H_2S$, CO, $CO_2$, and/or $NH_3$. The mixed mineral and biocomponent feedstream can then be passed into a supplemental hydrotreatment reactor. The supplemental hydrotreatment reactor can include one or more catalyst beds containing a hydrotreating catalyst. In one embodiment, the supplemental hydrotreatment reactor can be another ebullating bed reactor. The diesel range compounds can contact the hydrotreating catalyst in the supplemental hydrotreatment reactor under hydrodesulfurization conditions. The output stream from the supplemental hydrotreatment reactor can be a fuel, e.g., a diesel fuel with an improved cetane number and a sulfur content of 10 ppm by weight or less.

The catalyst in the supplemental hydrotreatment reactor can be a (hydrotreating) catalyst as described above, e.g., comprising a Group VIB metal and/or a Group VIII metal, optionally on a support, optionally sulfided, and/or optionally containing additional components.

The reaction conditions in the supplemental hydrotreatment reactor can be conditions suitable for reducing the sulfur content of the feedstream, e.g., to about 10 ppm by weight or less, as the feedstream is exposed to the catalyst beds in the reaction zone. The reaction conditions in the supplemental hydrotreatment reactor can include an LHSV of about 0.1 $hr^{-1}$ to about 10 $hr^{-1}$, a total pressure of about 100 psig to about 4000 psig (about 690 kPag to about 27.6 MPag), and a temperature of about 450° F. to about 800° F. (about 232° C. to about 427° C.). Preferably, the reaction conditions include an LHSV of from about 0.1 $hr^{-1}$ to about 5 $hr^{-1}$, a total pressure of about 200 psig to about 1500 psig (about 1.4 MPag to about 10.3 MPag), a hydrogen treat gas ratio of about 100 scf/bbl to about 10000 scf/bbl (about 17 $Nm^3/m^3$ to about 1700 $Nm^3/m^3$) of at least 80% hydrogen (e.g., remainder inert gas), and a temperature of about 550° F. to about 750° F. (about 288° C. to about 399° C.).

The product from the second reactor can undergo a variety of additional process steps. Optionally, the product from the second reactor can be separated into a gas phase product and a liquid phase product using a separator. The gas phase product from the separator can be recycled for further use in the second hydrotreating reactor. After separation, the liquid phase product from the second hydrotreating reactor can be exposed to a hydroisomerization catalyst under hydroisomerization conditions. Suitable hydroisomerization catalysts and conditions are those previously described above. Optionally, before such a hydroisomerization step, the liquid phase product can be passed through a liquid treatment step, such as by exposing the liquid to filtration, a caustic solution wash, or a treatment with chemical agents to remove sulfur and trace contaminants. Additionally or alternately, the liquid phase product can be passed through a sulfur adsorption step, such as by exposing the liquid stream to metallic Ni, ZnO, or another adsorber of sulfur species. In another optional embodiment, the hydrotreated feed can be blended with a feed containing fatty acid alkyl esters (such as FAME and/or FAEE), to further increase the amount of biocomponent.

Figure 3:
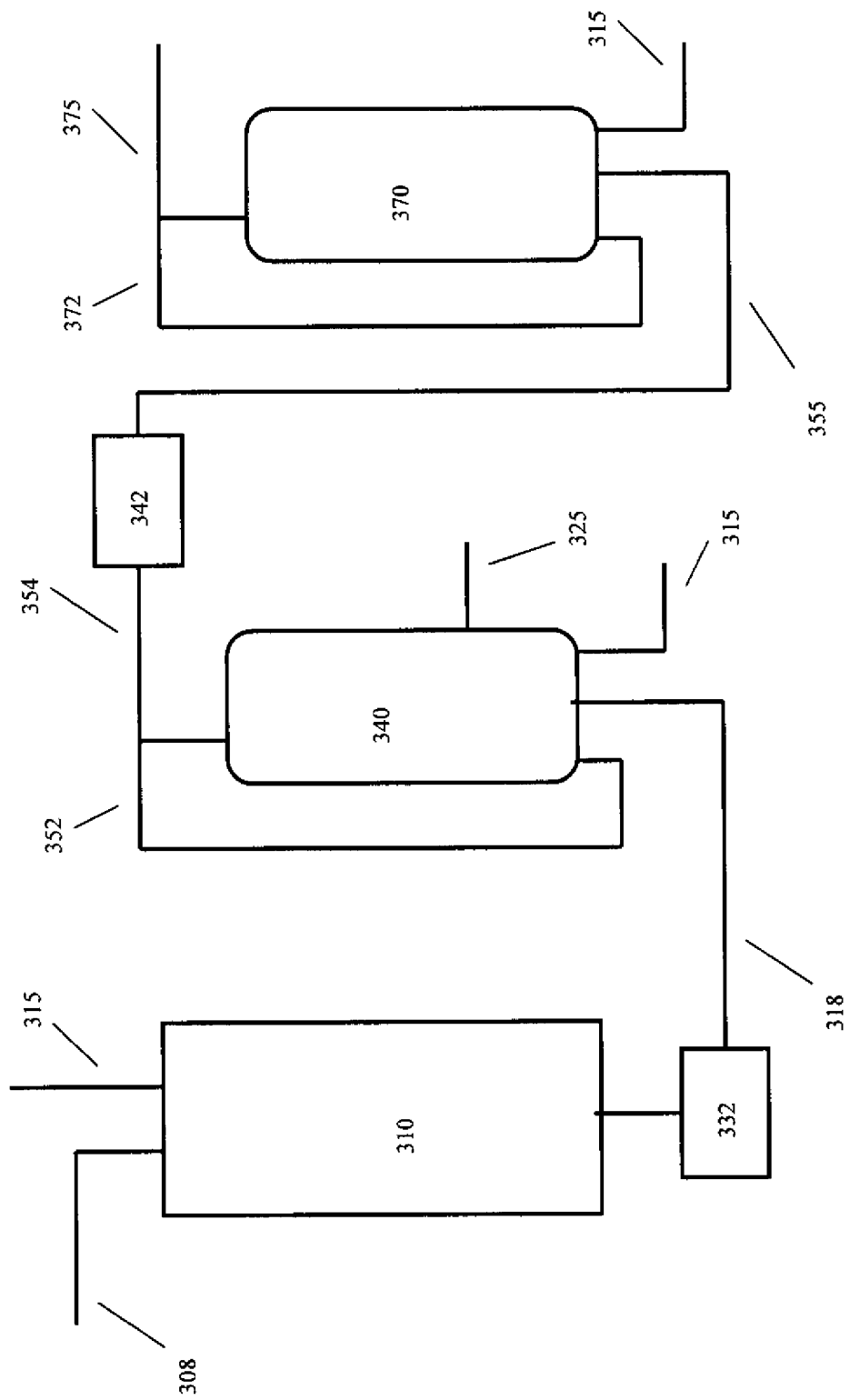
FIG. 3 schematically shows a processing scheme according to an embodiment of the invention.

A reaction system suitable for carrying out the above processes is shown schematically in FIG. 3. In the embodiment shown in FIG. 3, a heavy mineral hydrocarbon feedstock 308 can be introduced into a first reactor 310. The first reactor 310 can be a hydrotreatment reactor, a hydrocracking reactor, or another suitable reactor for a process that results in feed conversion to produce a diesel boiling range feed from a heavier feed. A hydrogen treat gas stream 315 can also be introduced into first reactor 310.

In the embodiment shown in FIG. 3, first reactor 310 can produce an effluent that includes a diesel boiling range fraction 318. A fractionator or separator 332 can be used to separate the diesel boiling range fraction 318 from the effluent of the first reactor. The diesel boiling range fraction 318 can enter ebullating bed reactor 340, along with a biocomponent feed 325. Preferably, the diesel boiling range fraction 318 and the biocomponent feed 325 are mixed in the ebullating bed reactor, so that the biocomponent feed can be introduced into the reactor above the catalyst support grid. After treatment in reactor 340, a portion of the effluent can be recycled via line 352 back to the reactor. The remaining portion of the effluent in line 354 can flows into separator 342, which can separate out any gaseous products and/or contaminants, such as $H_2$, $H_2S$, CO, $CO_2$, and/or $NH_3$, that are present in the hydrotreated effluent. Optionally, hydrogen gas from separator 342 can be used as a recycled hydrogen gas stream (not shown). The liquid fraction 355 from separator 342 can then be passed to a supplemental hydrotreatment reactor 370. The liquid effluent 375 from supplemental hydrotreatment reactor 370 can advantageously be suitable for use as a fuel product, such as a diesel fuel product, or may be optionally further treated, such as by hydroisomerization.

In the embodiment shown in FIG. 3, the hydrotreatment reactor 370 can advantageously represent another ebullating bed reactor. As a result, part of the effluent can be recycled via line 372. Alternately, a fixed bed or other type of reactor may be used for hydroisomerization reactor 370.

Configuration Example 3

Co-Processing of Biocomponent and Heavy Feed, Followed by Hydrotreatment of Diesel Boiling Range Portion In still other various embodiments, a mineral hydrocarbon feedstock can be co-processed with the biocomponent feedstock in an ebullating bed stage. The mineral feedstock can preferably be a feedstock with an initial boiling point of at least about 550° F. (about 288° C.), for example at least about 600° F. (about 315° C.) or at least about 650° F. (about 343° C.). Alternately, the feedstock can be characterized by the boiling point required to boil a specified percentage of the feed. For example, the temperature required to boil at least 5 wt % of a feed is referred to as a "T5" boiling point. Preferably, the mineral hydrocarbon feedstock can have a T5 boiling point of at least about 600° F. (about 315° C.), for example at least about 650° F. (about 343° C.) or at least about 665° F. (about 352° C.). Preferably, the mineral hydrocarbon feed can have a T95 boiling point of about 1100° F. (about 593° C.) or less, for example about 1050° F. (about 566° C.) or less. An example of this type of feed is a catalytically cracked feed (e.g., for FCC). Such a feed is typically hydroprocessed in a relatively high severity hydrotreatment stage prior to introduction into the fluid catalytic cracking stage.

In the ebullating bed, some conversion of higher boiling point components to lower boiling points can occur. As a result, a relatively high severity hydrotreatment stage typically makes some diesel range compounds. During fractionation, these diesel range compounds can be separated out and can mix with the biocomponent based diesel product.

In various embodiments of the invention, the feed to the ebullating bed stage can include both feeds from biocomponent sources, such as vegetable sources (including plant sources such as algae) or animal sources, and feeds from mineral sources. The feed can include varying amounts of feedstreams based on biocomponent sources, such as vegetable oils, animal fats, fish oils, algae oils or fats, pyrolysis oils, or the like, or combinations or derivatives thereof For example, the feed may, in some embodiments include a feedstream derived from a biocomponent source, such as from a vegetable oil or an algae oil, e.g., where a carboxylic acid alkyl ester (typically having from 8 to 36 carbons attached to the carboxylate carbon, preferably from 10 to 26 carbons, for example from 14 to 22 carbons; also typically having from 1 to 24 carbons attached via an ester bond to the carboxylate moiety, preferably from 1 to 18 carbons, more preferably from 1 to 12 carbons, for example from 1 to 8 carbons). The feed can include at least about 0.1 wt % of feed based on a biocomponent source, for example at least about 0.5 wt %, at least about 1 wt %, at least about 3 wt %, at least about 10 wt %, or at least about 15 wt %. In such embodiments, the feed can include about 99 wt % or less of biocomponent, for example about 80 wt % or less, about 60 wt % or less, about 50 wt % or less, about 40 wt % or less, or about 30 wt % or less. In other embodiments, the amount of co-processing can be small, with a feed that includes at least about 0.5 wt % of feedstock based on a biocomponent source, for example at least about 1 wt %, at least about 2.5 wt %, or at least about 5 wt %. In such embodiments, the feed can include about 20 wt % or less of biocomponent based feedstock, for example about 15 wt % or less, about 10 wt % or less, or about 5 wt % or less.

The combined feedstock can be introduced into an ebullating bed (or other fluidized bed) reactor that includes a catalyst bed that contains a hydrotreatment catalyst. The combined feedstock can be exposed to fluidized catalyst bed while being exposed to hydrodesulfurization and hydrodeoxygenation conditions. Such conditions can also result in olefin saturation of any olefins present in the biocomponent feedstock. In this first ebullating bed hydrotreatment reactor, relatively higher severity conditions can be employed in order to appropriately treat the heavier mineral feed that is mixed with the biocomponent feed.

The catalyst in the ebullating bed reactor can be a (hydrotreating) catalyst comprising a Group VIB metal and/or a Group VIII metal, optionally on a support. Suitable metals can include cobalt, nickel, molybdenum, tungsten, and combinations thereof. Suitable supports can include silica, silica-alumina, alumina, and titania. While one preferred embodiment includes a catalyst comprising a Group VIB metal and a Group VIII metal (e.g., in oxide form, or preferably after the oxide form has been sulfidized under appropriate sulfidization conditions), optionally on a support, the catalyst may additionally or alternately contain additional components, such as other transition metals (e.g., Group V metals such as niobium), rare earth metals, organic ligands (e.g., as added or as precursors left over from oxidation and/or sulfidization steps), phosphorus compounds, boron compounds, fluorine-containing compounds, silicon-containing compounds, promoters, binders, fillers, or like agents, or combinations thereof. Preferably, a catalyst can be selected for use in the ebullating bed that has sufficient durability to avoid excessive catalyst degradation due to creation of catalyst dust and fines.

The reaction conditions in the ebullating bed reactor can be conditions suitable for reducing the sulfur content of the feedstream while also deoxygenating the feedstream (and optionally but preferably also saturating olefins) as the feedstream is exposed to the catalyst beds in the reactor. In a preferred embodiment, the reaction conditions of the ebullating bed reactor can be selected to perform a thorough hydrodeoxygenation while reducing the sulfur of the feedstock to a content between about 800 wppm and about 1500 wppm. Alternatively, the reaction conditions in the first hydrotreatment reactor can be selected to reduce the sulfur content to between about 100 wppm and about 200 wppm. In still other embodiments, the sulfur can be reduced to about 1500 wppm or less, or about 1000 wppm or less, or about 500 wppm or less, or about 200 wppm or less. Despite the sulfur content being reduced during this relatively high severity treatment, the sulfur content can still be about 50 wppm or more, for example about 100 wppm or more, about 200 wppm or more, or even about 500 wppm or more.

The reaction conditions can include an LHSV of about 0.3 $hr^{-1}$ to about 2.0 $hr^{-1}$, a total pressure of about 800 psig to about 3000 psig (about 5.5 MPag to about 20.7 MPag), a treat gas ratio of at least about 2000 scf/bbl (about 340 $Nm^3/m^3$) of at least about 80% hydrogen (e.g., remainder inert gas), and a temperature of about 650° F. to about 800° F. (about 343° C. to about 427° C.). Preferably, the reaction conditions include an LHSV of about 0.9 $hr^{-1}$ to about 1.1 $hr^{-1}$, a total pressure of about 1400 psig to about 2000 psig (about 9.7 MPag to about 13.8 MPag), a hydrogen treat gas ratio of about 2100 to about 2500 scf/bbl (about 350 $Nm^3/m^3$ to about 420 $Nm^3/m^3$) of at least about 80% hydrogen (e.g., remainder inert gas), and a temperature of about 700° F. to about 750° F. (about 371° C. to about 399° C.). Alternatively, the hydrogen treat gas ratio can be about 2000 scf/bbl to about 3000 scf/bbl (about 340 $Nm^3/m^3$ to about 505 $Nm^3/m^3$).

In an embodiment, the biocomponent portion of the feedstock can be pretreated to remove impurities prior to hydrotreatment. This pretreatment can occur prior to mixing the biocomponent portion of the feedstock with the mineral portion. The pretreatment can include passing the biocomponent portion through an adsorbent to remove metals, filtering the biocomponent portion to remove sediment, or other processes. Additionally or alternately, an optional metals removal pretreatment can take place in the first reactor after mixing of the biocomponent and mineral hydrocarbon feeds, by exposing the combined feedstock to a demetallization catalyst under demetallization conditions prior to hydrodesulfurization and/or hydrodeoxygenation.

After hydrotreatment in the relatively higher severity stage, the hydrotreated feed can be passed to a fractionator to separate diesel range compounds from heavier compounds. This can advantageously produce a diesel boiling range fraction containing the diesel range compounds. The fractionation can also result in removal of gas phase products, such as $H_2S$, $CO$, $CO_2$, and/or $NH_3$. After fractionation, the diesel boiling range fraction can optionally be mixed with a separate diesel boiling range feedstream prior to the relatively less severe hydrotreatment stage. Suitable diesel boiling range feedstreams can boil within the range of about 215° F. (about 102° C.) to about 800° F. (about 427° C.). Preferably, the diesel boiling range feedstream has an initial boiling point of at least about 250° F. (about 121° C.), or at least about 300° F. (about 149° C.), or at least about 350° F. (about 177° C.), or at least about 400° F. (about 204° C.), or at least about 451° F. (about 233° C.). Preferably, the diesel boiling range feedstream has a final boiling point of about 800° F. (about 427° C.) or less, for example about 775° F. (about 413° F.) or less or about 750° F. (about 399° C.) or less. In an embodiment, the diesel boiling range feedstream has a boiling range from about 451° F. (233° C.) to about 800° F. (427° C.). In another embodiment, the diesel boiling range feedstream also includes kerosene range compounds to provide a feedstream with a boiling range from about 250° F. (121° C.) to about 800° F. (427° C.). The separate diesel boiling range feedstream can be mineral based, biocomponent based, or a mixture of mineral and biocomponent based.

After passing through the first hydrotreatment reactor and the fractionator, the diesel boiling range fraction (and any additional diesel boiling range feedstream) can be passed into a second hydrotreatment reactor. The second hydrotreatment reactor can include one or more catalyst beds containing a hydrotreating catalyst. The diesel range compounds can contact the hydrotreating catalyst in the second hydrotreatment reactor under hydrodesulfurization conditions. The output stream from the second hydrotreatment reactor can be a diesel fuel with an improved cetane number (compared to the cetane number from the first hydrotreatment reactor) and a sulfur content of about 15 wppm or less, for example about 10 wppm or less.

The catalyst in the supplemental hydrotreatment reactor can be a (hydrotreating) catalyst as described above, e.g., comprising a Group VIB metal and/or a Group VIII metal, optionally on a support, optionally sulfided, and/or optionally containing additional components.

The reaction conditions in the supplemental hydrotreatment reactor can be conditions suitable for reducing the sulfur content of the feedstream, e.g., to about 10 ppm by weight or less, as the feedstream is exposed to the catalyst beds in the reaction zone. The reaction conditions in the supplemental hydrotreatment reactor can include an LHSV of about 0.1 hr$^{-1}$ to about 10 hr$^{-1}$, a total pressure of about 100 psig to about 4000 psig (about 690 kPag to about 27.6 MPag), and a temperature of about 450° F. to about 800° F. (about 232° C. to about 427° C.). Preferably, the reaction conditions include an LHSV of from about 0.1 hr$^{-1}$ to about 5 hr$^{-1}$, a total pressure of about 200 psig to about 1500 psig (about 1.4 MPag to about 10.3 MPag), a hydrogen treat gas ratio of about 100 scf/bbl to about 10000 scf/bbl (about 17 Nm$^3$/m$^3$ to about 1700 Nm$^3$/m$^3$) of at least 80% hydrogen (e.g., remainder inert gas), and a temperature of about 550° F. to about 750° F. (about 288° C. to about 399° C.).

Figure 4:
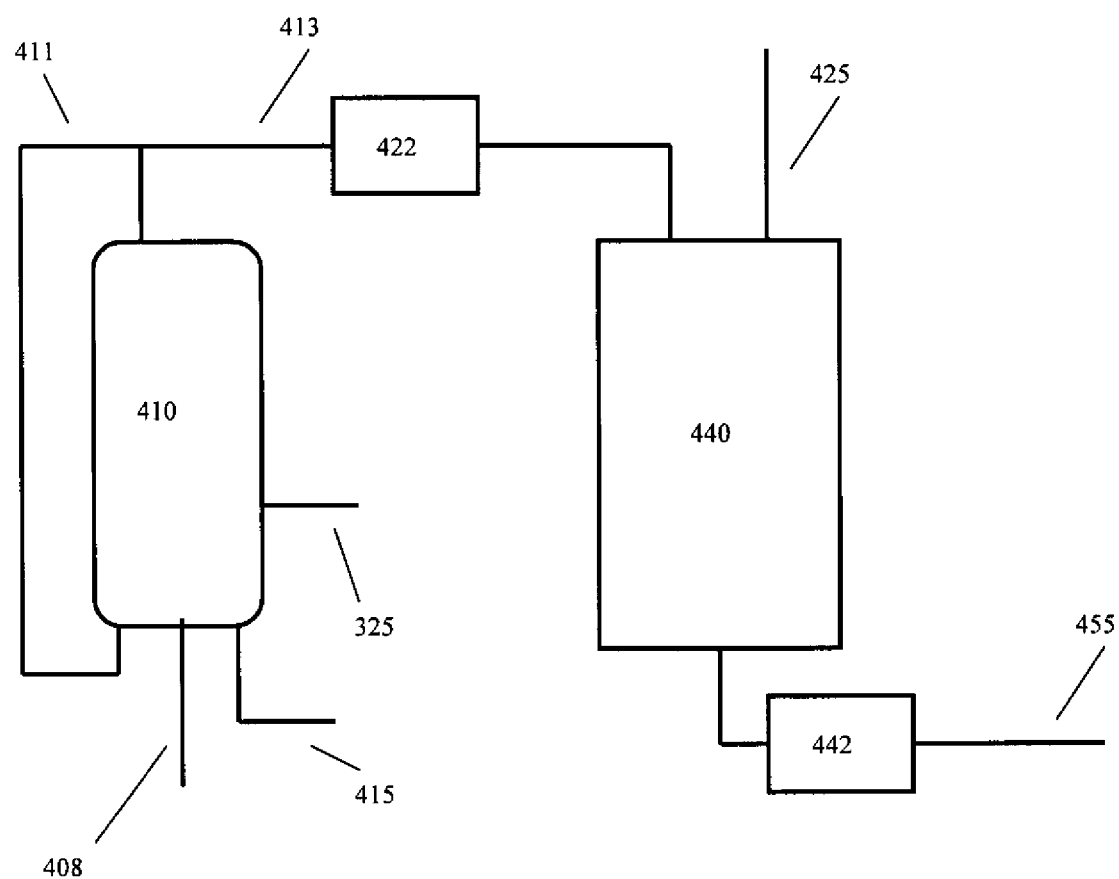
FIG. 4 schematically shows a processing scheme according to an embodiment of the invention.

A reaction system suitable for carrying out the above processes is shown schematically in FIG. 4. In FIG. 4, a combined mineral hydrocarbon and biocomponent feedstock 408 can be introduced into a first ebullating bed hydrotreatment reactor 410. A hydrogen treat gas stream 415 is also introduced into hydrotreatment reactor 410. The combined feedstock can be exposed to hydrotreating conditions in first hydrotreatment reactor 410 in the presence of one or more catalyst beds that contain hydrotreating catalyst. Preferably, this can reduce the sulfur content in the distillate cut of the treated feedstock to about 400 wppm or less, for example about 200 wppm or less or about 100 wppm or less. A portion of the treated feedstock 411 can be used as a recycle feed for the ebullating bed reactor. The remainder of the treated feedstock 413 can optionally flow into a fractionator or separator 422. Fractionator 422 can advantageously separate out a diesel boiling range fraction in the feed from the heavier products. Fractionator 422 can also separate out any gaseous contaminants, such as H$_2$S, CO, CO$_2$, and/or NH$_3$, that are present after the first hydrotreatment stage.

After passing through first hydrotreatment reactor 410 and optionally separator 422, the diesel boiling range fraction can enter second hydrotreatment reactor 440, optionally but preferably along with a second hydrogen treat gas stream 425. This can reduce the sulfur content of the treated combined feedstocks to about 15 wppm or less, for example about 10 wppm or less. Optionally, the treated feedstock can then pass through a second separator 442 for separating gas phase and liquid phase products to produce a liquid diesel fuel product 455. In such an embodiment, hydrogen gas from separator 442 can be used as a recycled gas stream (not shown, preferably containing hydrogen, for example containing at least 25 wt % hydrogen) for the second hydrotreatment reactor.

The product from the second reactor can undergo a variety of additional process steps. After separation, the liquid phase product from the second hydrotreating reactor can be exposed to a hydroisomerization catalyst under hydroisomerization conditions. Optionally, before such a hydroisomerization step, the liquid phase product can be passed through a liquid treatment step, such as by exposing the liquid to filtration, a caustic solution wash, or a treatment with chemical agents to remove sulfur and trace contaminants. Additionally or alternately, the liquid phase product can be passed through a sulfur adsorption step, such as by exposing the liquid stream to metallic Ni, ZnO, or another adsorber of sulfur species. In another optional embodiment, the hydrotreated feed can be blended with a feed containing fatty acid alkyl esters (such as FAME and/or FAEE), to further increase the amount of biocomponent.

This invention also extends to a fuel, such as diesel fuel, heating oil, or jet fuel, when prepared by the processes as described herein.

In one embodiment, the product hydrocarbon stream recovered from the co-processing of the mixed mineral/biocomponent feed in the ebullating bed reactor(s) can comprise at least 90 wt % saturated hydrocarbons (preferably at least 93 wt % or at least 95 wt %; typically up to about 99.9 wt %, up to about 99.5 wt %, up to about 99 wt %, or up to about 98 wt %), less than 1 wt % ester-containing compounds (for example less than 0.5 wt %, less than 0.2 wt %, less than 0.1 wt %, less than 500 wppm, less than 200 wppm, or less than 100 wppm; if any ester-containing compounds are detectable, they can be present in amounts as low as 100 wppb, 200 wppb, 500 wppb, 1 wppm, 2 wppm, 5 wppm, or 10 wppm), less than 1 wt % acid-containing compounds (for example less than 0.5 wt %, less than 0.2 wt %, less than 0.1 wt %, less than 500 wppm, less than 200 wppm, less than 100 wppm, less than 75 wppm, less than 50 wppm, or less than 25 wppm; if any acid-containing compounds are detectable, they can be present in amounts as low as 100 wppb, 200 wppb, 500 wppb, 1 wppm, 2 wppm, or 5 wppm), and not more than 10 wppm sulfur-containing compounds, based on the total weight of the product hydrocarbon stream. In this embodiment, the product hydrocarbon stream can be used as, and/or can be used as a blend component in combination with one or more other hydrocarbon streams, to form a diesel fuel, a jet fuel, a heating oil, or a portion of a distillate pool.

Additionally or alternately, the invention can also include one or more of the following embodiments.

Embodiment 1

A method for producing a low sulfur diesel product, comprising: hydrotreating a diesel boiling range mineral feedstock in a first reaction zone under first effective hydrotreating conditions to produce a hydroprocessed feedstock; cascading the hydrotreated diesel boiling range effluent to an ebullating bed reactor; introducing a biocomponent feedstock into the ebullating bed reactor at a location above the catalyst support grid; and hydrotreating the mixed mineral and biocomponent feeds in the ebullating bed reactor under second effective hydrotreating conditions to produce a diesel boiling range product.

Embodiment 2

A method for producing a low sulfur diesel product, comprising: introducing a mineral feedstock having a T5 boiling point of at least about 600° F. (about 315° C.); hydroprocessing the mineral feedstock in a first reaction zone under first effective hydroprocessing conditions to cause conversion of at least a portion of the mineral feedstock to diesel boiling range compounds; fractionating the hydroprocessed feedstock to produce a diesel boiling range fraction and a portion having a higher boiling range than the diesel boiling range fraction; mixing the diesel boiling range fraction with a biocomponent feedstock in an ebullating bed reactor, the biocomponent feedstock being introduced above the catalyst support grid; hydrotreating the mixed feedstock in the ebullating bed reactor under second effective hydrotreating conditions; and hydrotreating the liquid effluent from the ebullating bed reactor in a supplemental reactor under third effective hydrotreating conditions to make a diesel boiling range product having a desired sulfur content specification.

Embodiment 3

The method of embodiment 1, wherein the first effective hydrotreating conditions comprise an LHSV of about 0.1 hr$^{-1}$ to about 10 hr$^{-1}$, a total pressure of about 100 psig to about 4000 psig (about 690 kPag to about 27.6 MPag), and a temperature of about 450° F. to about 800° F. (about 232° C. to about 427° C.).

Embodiment 4

The method of embodiment 2, wherein the first effective hydroprocessing conditions comprise an LHSV of about 0.3 hr$^{-1}$ to about 2.0 hr$^{-1}$, a total pressure of about 800 psig to about 3000 psig (about 5.5 MPag to about 20.7 MPag), a treat gas ratio of at least about 2000 scf/bbl (about 340 Nm$^3$/m$^3$) of at least about 80% hydrogen (e.g., remainder inert gas), and a temperature of about 650° F. to about 800° F. (about 343° C. to about 427° C.).

Embodiment 5

The method of any one of the previous embodiments, wherein the second effective hydrotreating conditions comprise an LHSV of about 0.2 hr$^{-1}$ to about 4 hr$^{-1}$, a total pressure of about 300 psig to about 1500 psig (about 2.1 MPag to about 10.3 MPag), and a temperature of about 600° F. to about 700° F. (about 315° C. to about 371° C.).

Embodiment 6

The method of any one of the previous embodiments, further comprising hydroisomerizing the diesel boiling range product.

Embodiment 7

The method of embodiment 6, wherein hydroisomerizing the diesel boiling range product comprises exposing the diesel boiling range product to a hydroisomerization catalyst under effective hydroisomerization conditions comprising a temperature of about 250° C. to about 450° C., a pressure of about 300 psig to about 3000 psig (about 2.1 MPag to about 20.7 MPag), an LHSV of about 0.1 hr$^{-1}$ to about 5.0 hr$^{-1}$, and a treat gas ratio of about 500 scf/bbl to about 5000 scf/bbl (about 84 Nm$^3$/m$^3$ to about 840 Nm$^3$/m$^3$).

Embodiment 8

The method of any one of the previous embodiments, further comprising hydrofinishing the diesel boiling range product.

Embodiment 9

The method of embodiment 8, wherein hydrofinishing the diesel boiling range product comprises exposing the diesel boiling range product to a hydrotreatment catalyst under effective hydrofinishing conditions comprising an LHSV of about 0.5 hr$^{-1}$ to about 10 hr$^{-1}$, a total pressure of about 100 psig to about 4000 psig (about 690 kPag to about 27.6 MPag), and a temperature of about 450° F. to about 800° F. (about 232° C. to about 427° C.).

Embodiment 10

The method of any one of the previous embodiments, wherein the biocomponent feedstock comprises about 20 wt % to about 75 wt % of an animal fat.

Embodiment 11

The method of any one of the previous embodiments, wherein the biocomponent feedstock comprises about 20 wt % to about 75 wt % of a crude vegetable oil.

Embodiment 12

The method of any one of the previous embodiments, wherein the biocomponent feedstock comprises about 20 wt % to about 75 wt % of an algae oil or fat.

Embodiment 13

The method of any one of the previous embodiments, wherein the oxygen content of the diesel boiling range product is about 0.1 wt % or less.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for producing a low sulfur diesel product, comprising:
   hydrotreating a diesel boiling range mineral feedstock in a first reaction zone under first effective hydrotreating conditions to produce a hydroprocessed feedstock;
   cascading the hydrotreated diesel boiling range effluent to an ebullating bed reactor;
   introducing a biocomponent feedstock into the ebullating bed reactor at a location above the catalyst support grid; and
   hydrotreating the mixed mineral and biocomponent feeds in the ebullating bed reactor under second effective hydrotreating conditions to produce a diesel boiling range product.

2. The method of claim 1, wherein the first effective hydrotreating conditions comprise an LHSV of about 0.1 hr$^{-1}$ to about 10 hr$^{-1}$, a total pressure of about 100 psig to about 4000 psig (about 690 kPag to about 27.6 MPag), and a temperature of about 450° F. to about 800° F. (about 232° C. to about 427° C.).

3. The method of claim 1, wherein the second effective hydrotreating conditions comprise an LHSV of about 0.2 hr$^{-1}$ to about 4 hr$^{-1}$, a total pressure of about 300 psig to about 1500 psig (about 2.1 MPag to about 10.3 MPag), and a temperature of about 600° F. to about 700° F. (about 315° C. to about 371° C.).

4. The method of claim 1, further comprising hydroisomerizing the diesel boiling range product.

5. The method of claim 4, wherein hydroisomerizing the diesel boiling range product comprises exposing the diesel boiling range product to a hydroisomerization catalyst under effective hydroisomerization conditions comprising a temperature of about 250° C. to about 450° C., a pressure of about 300 psig to about 3000 psig (about 2.1 MPag to about 20.7 MPag), an LHSV of about 0.1 hr$^{-1}$ to about 5.0 hr$^{-1}$, and a treat gas ratio of about 500 scf/bbl to about 5000 scf/bbl (about 84 Nm$^3$/m$^3$ to about 840 Nm$^3$/m$^3$).

6. The method of claim 1, further comprising hydrofinishing the diesel boiling range product.

7. The method of claim 6, wherein hydrofinishing the diesel boiling range product comprises exposing the diesel boiling range product to a hydrotreatment catalyst under effective hydrofinishing conditions comprising an LHSV of about 0.5 hr$^{-1}$ to about 10 hr$^{-1}$, a total pressure of about 100 psig to about 4000 psig (about 690 kPag to about 27.6 MPag), and a temperature of about 450° F. to about 800° F. (about 232° C. to about 427° C.).

8. The method of claim 1, wherein the biocomponent feedstock comprises about 20 wt % to about 75 wt % of an animal fat.

9. The method of claim 1, wherein the biocomponent feedstock comprises about 20 wt % to about 75 wt % of a crude vegetable oil.

10. The method of claim 1, wherein the biocomponent feedstock comprises about 20 wt % to about 75 wt % of an algae oil or fat.

11. The method of claim 1, wherein the oxygen content of the diesel boiling range product is about 0.1 wt % or less.

12. The method of claim 1, further comprising at least one of, prior to introducing a biocomponent feedstock into the ebullating bed reactor, passing the biocomponent feedstock through an adsorbent or filtering the biocomponent portion.

* * * * *